(12) United States Patent
Edenfeld

(10) Patent No.: US 7,218,012 B1
(45) Date of Patent: May 15, 2007

(54) EMERGENCY PITCH DRIVE POWER SUPPLY

(75) Inventor: Thomas Edenfeld, Osnabrück (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/421,405

(22) Filed: May 31, 2006

(51) Int. Cl.
F09D 9/00 (2006.01)

(52) U.S. Cl. .................. 290/44; 290/55; 290/1 A; 290/1 R (58) Field of Classification Search ............ 290/44, 290/55, 1 A, 1 R, 1 C
See application file for complete search history.

(56) References Cited

U.S. PATENT DOCUMENTS

| | | | |
|---|---|---|---|
| 4,525,633 A * | 6/1985 | Wertheim et al. ......... 290/44 |
| 4,695,736 A * | 9/1987 | Doman et al. ............. 290/44 |
| 4,700,081 A * | 10/1987 | Kos et al. ................ 290/44 |
| 4,703,189 A * | 10/1987 | DiValentin et al. ........ 290/44 |
| 5,083,039 A * | 1/1992 | Richardson et al. ........ 290/44 |
| 6,531,788 B2 * | 3/2003 | Robson .................... 290/43 |
| 6,921,243 B2 * | 7/2005 | Canini et al. ............ 415/4.3 |
| 6,921,985 B2 * | 7/2005 | Janssen et al. ............ 290/44 |
| 6,933,625 B2 * | 8/2005 | Feddersen et al. ......... 290/44 |

* cited by examiner

*Primary Examiner*—Darren Schuberg
*Assistant Examiner*—I. A. Mohandesi
(74) *Attorney, Agent, or Firm*—James E. McGinness, Esq.; Armstrong Teasdale LLP (57) ABSTRACT

An emergency pitch drive power supply is provided, the emergency pitch drive power supply comprising an auxiliary generator for producing electric power, wherein the auxiliary generator is a permanently excited multi-pole generator adapted to generate sufficient power for a pitch drive of a wind turbine when driven with wind rotor speed, and wherein the auxiliary generator is connected to at least one pitch drive motor of the wind turbine.

20 Claims, 7 Drawing Sheets

EMERGENCY PITCH DRIVE POWER SUPPLY

FIELD OF THE INVENTION

The present invention relates to an emergency pitch drive power supply for wind turbines.

BACKGROUND OF THE INVENTION

Typically, modern wind turbines have rotor blades with adjustable pitch angle. The rotor blades can be rotated about their longitudinal axis by means of a pitch drive disposed in the rotor hub. Typically, the pitch drive is actuated electrically or hydraulically. By adjusting the pitch angles of the rotor blades, the power generation of the wind turbine can be controlled as well as an aerodynamical braking of the rotor can be accomplished. Particularly, the rotor blades generate a braking torque when moved into feather position. Thereby, the rotor blades ensure that the rotor is not further accelerated and, thus, the rotor blades form an aerodynamical brake for the wind turbine.

The aerodynamical brake effect of the rotor blades is also used for braking the rotor in case of emergency, e.g. when a failure of the drive system occurs or when the wind turbine is in an uncontrolled condition. Accordingly, it is very important that the emergency system works absolutely reliable even when the wind turbine is damaged or in an uncontrolled state, e.g. due to lightning. Especially, the pitch drive is required to function even in a power outage condition.

At present, batteries in the hub are used for storing electric power supplied to the pitch drives in a case of emergency. Thus, the rotor blades can be turned out of the wind during an emergency fault even when the normal power supply for the pitch drive is out of function. However, the accumulators used as batteries are heavy-weight and need stable temperature conditions for proper functioning. Furthermore, their lifetime is limited and they require frequent maintenance. In addition, a complex charging circuit for recharging of the batteries is needed.

BRIEF DESCRIPTION OF THE INVENTION

In view of the above, an emergency pitch drive power supply is provided. The emergency pitch drive power supply includes an auxiliary generator for producing electric power, wherein the auxiliary generator is a permanently excited multi-pole generator adapted to generate sufficient power for a pitch drive of a wind turbine when driven with wind rotor speed. Furthermore, the auxiliary generator is connected to at least one pitch drive motor of the wind turbine.

Thus, the provision of batteries as energy storage for emergency cases is rendered unnecessary. Instead, the auxiliary generator utilizes the rotational energy of the wind rotor to adjust the pitch of the rotor blades for aerodynamical braking. The permanently excited generator is not dependent on an external power supply so that it functions properly even in cases of complete power outage of the wind turbine system. Furthermore, the auxiliary generator can be of a simple and robust design so that maintenance effort is cut down compared with that of battery energy storage. Finally, such an emergency pitch drive power supply is more reliable than a battery-based power supply which is an extremely important issue for fallback systems.

Further aspects, advantages and features of the present invention are apparent from the dependent claims, the description and the accompanying drawings.

According to a first aspect of the invention, an pitch drive power backup is provided. The pitch drive power backup includes a backup multi-pole generator with permanent magnets. The backup generator is designed to generate sufficient power for the pitch drive at low rotor speed. Furthermore, the backup generator is connected to the pitch drive of the wind turbine.

Thus, the provision of batteries as energy storage for emergency cases is rendered unnecessary. Instead, the backup generator supplies electric power generated from the wind energy captured by the wind rotor. Thus, the pitch drive is energized for turning the rotor blades out of the wind. Since the permanently excited backup generator does not rely on external power supply, its operation is ensured even in cases of complete power outage. Furthermore, the maintenance required by the backup generator is considerably reduced compared to that of battery energy storage. Finally, the pitch drive backup functions more reliably than a battery backup.

According to another aspect of the present invention, a wind turbine with a wind rotor having at least one rotor blade is provided. The pitch of the at least one rotor blade is adjustable by a pitch drive. Furthermore, the wind rotor is connected to a low-speed rotor shaft for driving a main generator. The wind turbine includes further a main generator drivable via the rotor shaft, and a permanently excited multi-pole auxiliary generator connected to the pitch drive.

Thus, the wind turbine is adapted to pitch its rotor blades into a feathered position even when no external power is available, e.g. in case of a complete grid failure. Furthermore, the maintenance effort, i.e. time and costs, are considerably reduced compared to a battery backup system. This improves the usability of such a wind turbine for remote locations, e.g. off-shore sites. Finally, the backup generator system is more robust compared to the battery backup system so that a wind turbine employing such an auxiliary generator is better adapted for harsh environmental conditions, e.g. off-shore conditions.

According to a further aspect of the present invention, a method for supplying electric power to at least one pitch drive of a wind turbine in a case of emergency is provided. The method includes the steps of providing a permanently excited multi-pole backup generator in a wind turbine, operating the backup generator with a low speed in the range from 12 to 50 rpm to generate electric power, and in case of emergency, supplying the thus generated electric power to the pitch drive to pitch the rotor blades to a feathered position.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
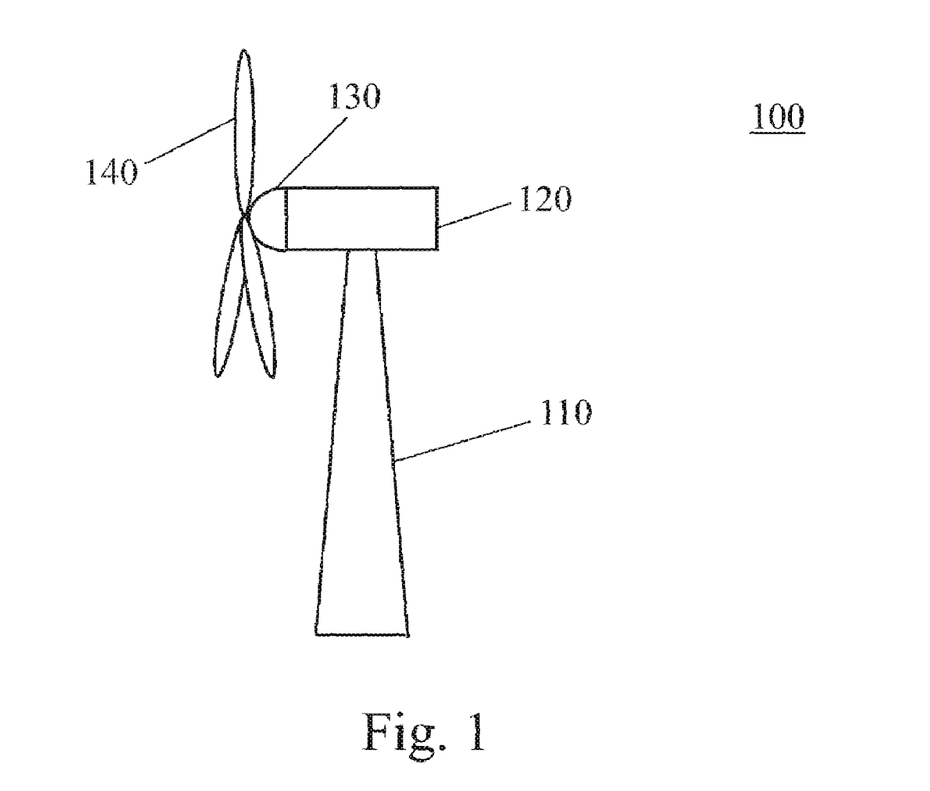
FIG. 1 is a schematic view of a wind turbine.

FIG. 1 is a schematic view of a wind turbine. The wind turbine 100 includes a tower 110 to which a machine nacelle 120 is mounted at its top end. The nacelle houses a drive train to which a main electric generator is connected. A hub 130 bearing three rotor blades 140 is mounted to a lateral end of the machine nacelle 120. The rotor blades 140 can be adjusted by pitch drives which are typically accommodated inside hub 130.

Figure 2:
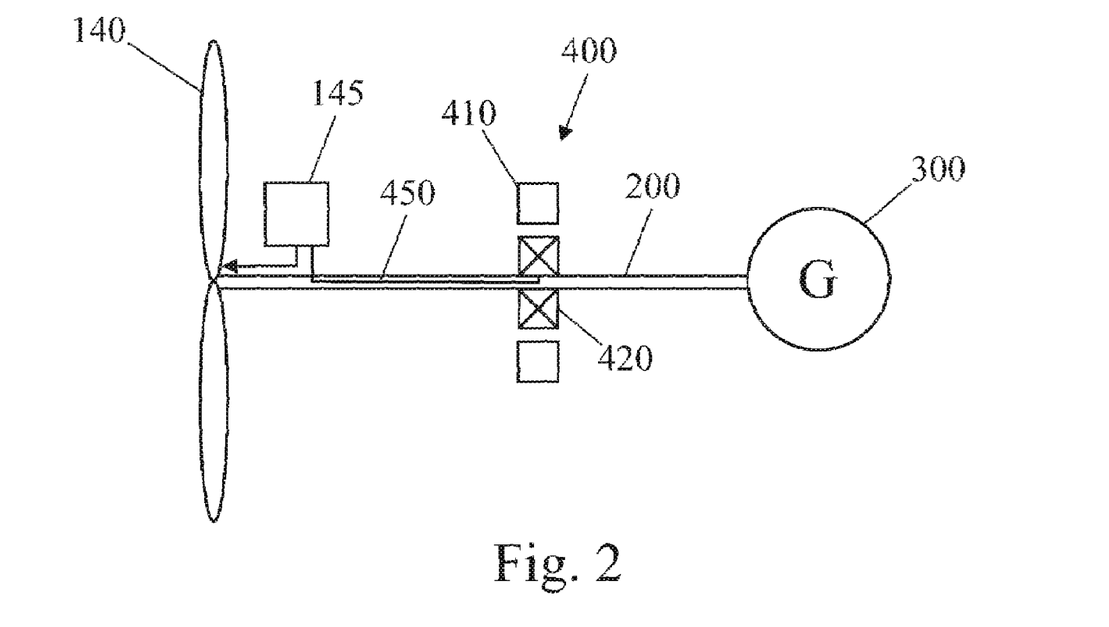
FIG. 2 is a block diagram of an emergency power supply according to an embodiment of the present invention.

FIG. 2 is a block diagram of an emergency power supply according to an embodiment of the present invention. Therein, the rotor blades 140 of the wind turbine capture energy from the wind and convert it into rotational energy. Therefore, the wind rotor of the turbine, i.e. the hub 130 and the rotor blades 140, start rotating when the wind speed exceeds a minimum wind speed. Typically, the rotation of the wind rotor is relatively low, e.g. in the range from 12 to 50 rpm, because of the large mass and diameter of the wind rotor. In particular, the rotor speed typically becomes smaller for larger turbines while the tip speed of the rotor blades may even increase. The rotational energy captured from the wind is transmitted to a main generator 300 via a shaft 200. Shaft 200 is a low-speed shaft since it is connected to hub 130 and, therefore, rotates also in the speed range of 12 to 50 rpm. Furthermore, the turbine includes a pitch drive system 145 for adjusting the pitch of the rotor blades 140. Typically, the pitch drive system 145 is disposed inside the rotor hub 130 but alternative solutions are also known in the art and the present invention can be employed to those alternative solutions as well. During normal operation, the pitch drive 145 is powered by main generator 300 via a supply line (not shown). Typically, low-speed shaft 200 is formed as a hollow shaft and the supply line is accommodated inside the hollow shaft.

Furthermore, an auxiliary generator 400 is provided. Auxiliary generator 400 is a permanently excited multi-pole generator which is adapted to supply pitch drive 145 with sufficient electric power via a supply line 450. The auxiliary generator 400 includes permanent magnets 410 which form the stator of the generator. Typically, the permanent magnets 410 are fixed to a main frame of the turbine inside nacelle 120. The auxiliary generator 400 further includes windings 420 which are mounted to low-speed shaft 200. When the low-speed shaft 200 is driven by the wind rotor, the windings 420 rotate with respect to the fixed permanent magnets 410 with the rotational speed of the shaft 200. The magnetic fields of permanent magnets 410 induce currents in windings 420 which can be used to energize pitch drive 145. In order to supply sufficient power to pitch drive 145, auxiliary generator 400 is adapted for the low rotational speed of shaft 200, e.g. 12 to 50 rpm. For this purpose, auxiliary generator 400 is a multi-pole generator having 12 to 60 poles so that sufficient electric power is produced even at low speeds.

According to one embodiment of the present invention, the windings 420 are three-phase windings and permanent magnets 410 induce an AC field in the three-phase windings 420 due to the rotation of the shaft. This AC voltage has a linear voltage/speed behavior and is provided via supply line 450 in the hollow shaft 200 to the hub portion of the wind turbine. There, the AC voltage can be supplied to a diode-bridge via a connector (not shown). The diode-bridge converts the AC voltage into a DC voltage which is then supplied to the DC motors of the pitch drive 145. Due to the linear speed/voltage dependency of auxiliary generator 400, the angular speed of DC motors 145 depends on the wind rotor speed. Thus, the blades 140 will be feathered faster if the wind rotor is overspeed. Alternatively, auxiliary generator 400 may also be formed as a DC generator so that the diode-bridge for AC/DC converting is not necessary.

According to another embodiment of the present invention, the auxiliary generator is a brushless three-phase synchronous generator. This type of generator is compact and almost wear-free. Furthermore, it draws almost no rotational energy from low-speed shaft 200 when being idle (no-load operation). Optionally, the pitch drive motors may be brushless three-phase asynchronous motors. The motors are of simple and compact design and, therefore, are almost wear-free and require only very little maintenance.

Figure 3:
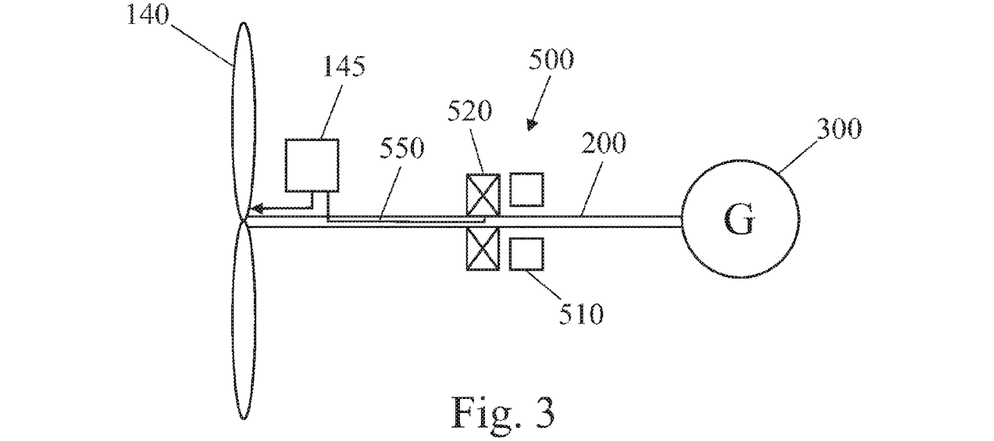
FIG. 3 is a block diagram of an emergency power supply according to another embodiment of the present invention.

FIG. 3 is a block diagram of an emergency power supply according to another embodiment of the present invention. The basic configuration is similar to the embodiment shown in FIG. 2 but the auxiliary generator 500 is formed as a ring generator 500. The windings 520 of auxiliary ring generator 500 are mounted to low-speed shaft 200 whereas the permanent magnets 510 are fixed relative to shaft 200. The windings 520 of auxiliary ring generator 500 are connected to the pitch drive 145 via a supply line 550. The explanations made above with respect to FIG. 2 apply to the embodiment shown in FIG. 3, accordingly, especially with respect to specific implementations of generator type and pitch motor type.

Figure 4:
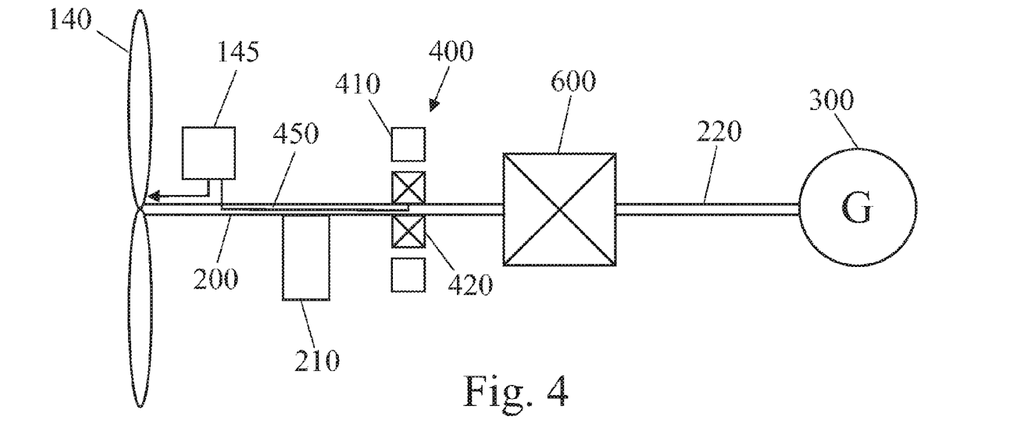
FIG. 4 is a block diagram of an emergency power supply according to a further embodiment of the present invention.

FIG. 4 is a block diagram of an emergency power supply according to a further embodiment of the present invention. The basic configuration is similar to the embodiment shown in FIG. 2 but the drive train shown in FIG. 4 further includes a gear box 600. Low-speed shaft 200 enters the drive end side of gear box 600 and a high-speed shaft 220 extends from the output side of gear box 600. High-speed shaft 220 is connected to the main generator 300, e.g. a double-feed asynchronous generator. Furthermore, it is shown that low-speed shaft 200 is supported on a main bearing 210. The windings 420 of auxiliary generator 400 are mounted to the low-speed shaft at a location between the gear box 600 and the main bearing 210 and are connected to the pitch drive 145 via supply line 450. The explanations made above with respect to FIG. 2 apply to the embodiment shown in FIG. 4, accordingly, especially with respect to specific implementations of generator type and pitch motor type.

Figure 5:
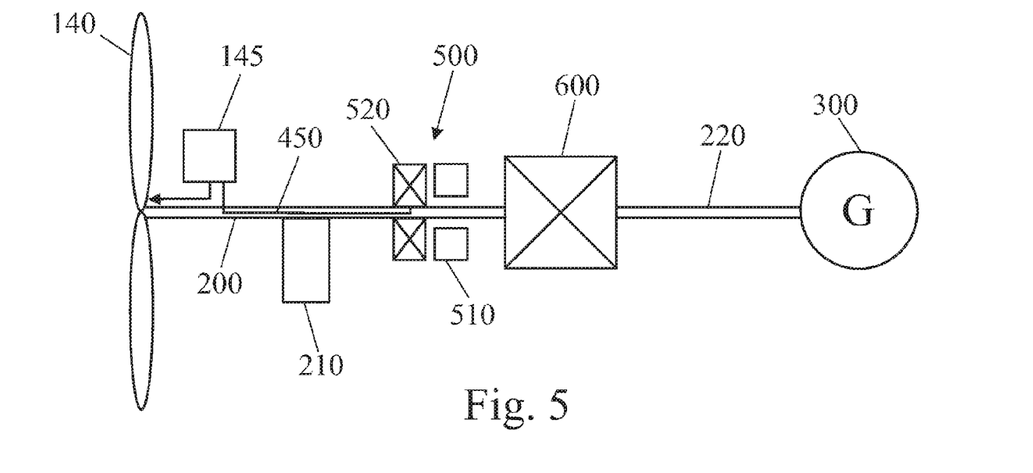
FIG. 5 is a block diagram of an emergency power supply according to still another embodiment of the present invention.

FIG. 5 is a block diagram of an emergency power supply according to still another embodiment of the present invention. The basic configuration is similar to the embodiment shown in FIG. 4 but the auxiliary generator 500 is formed as a ring generator 500. The windings 520 of auxiliary ring generator 500 are mounted to low-speed shaft 200 whereas the permanent magnets 510 are fixed relative to shaft 200. The windings 520 of auxiliary ring generator 500 are connected to the pitch drive 145 via supply line 550. Ring generator 500 is mounted between the gear box 600 and the main bearing 210. Furthermore, the explanations made above with respect to FIG. 2 apply to the embodiment shown in FIG. 5, accordingly, especially with respect to specific implementations of generator type and pitch motor type.

Figure 6:
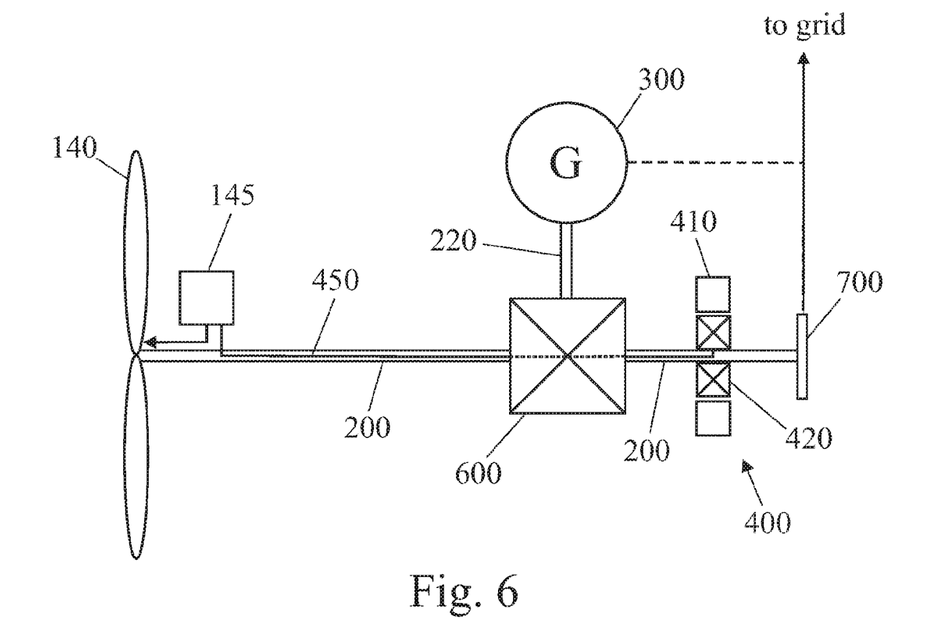
FIG. 6 is a block diagram of an emergency power supply according to an even further embodiment of the present invention.

FIG. 6 is a block diagram of an emergency power supply according to an even further embodiment of the present invention. The basic configuration is similar to the embodiment shown in FIG. 4. However, in the embodiment shown in FIG. 6 the low-speed shaft 200 extends through gear box 600 and has a slip ring transformer 700 mounted to its output side end. Typically, slip ring transformer 700 is coupled to the grid via a transformer (not shown). Alternatively or in addition, slip ring transformer 700 may be connected to main generator 300 (dashed line in FIG. 6). Slip ring transformer 700 is adapted to supply electric power to the installations inside the hub 130. For this purpose, a supply line (not shown) extends from slip ring transformer 700 through hollow shaft 200 to the hub. In this embodiment, auxiliary generator 400 is mounted to low-speed shaft 200 between the gear box and the slip ring transformer at the output end of gear box 600. Furthermore, the explanations made above with respect to FIG. 2 apply to the embodiment shown in FIG. 6, accordingly, especially with respect to specific implementations of generator type and pitch motor type.

Figure 7:
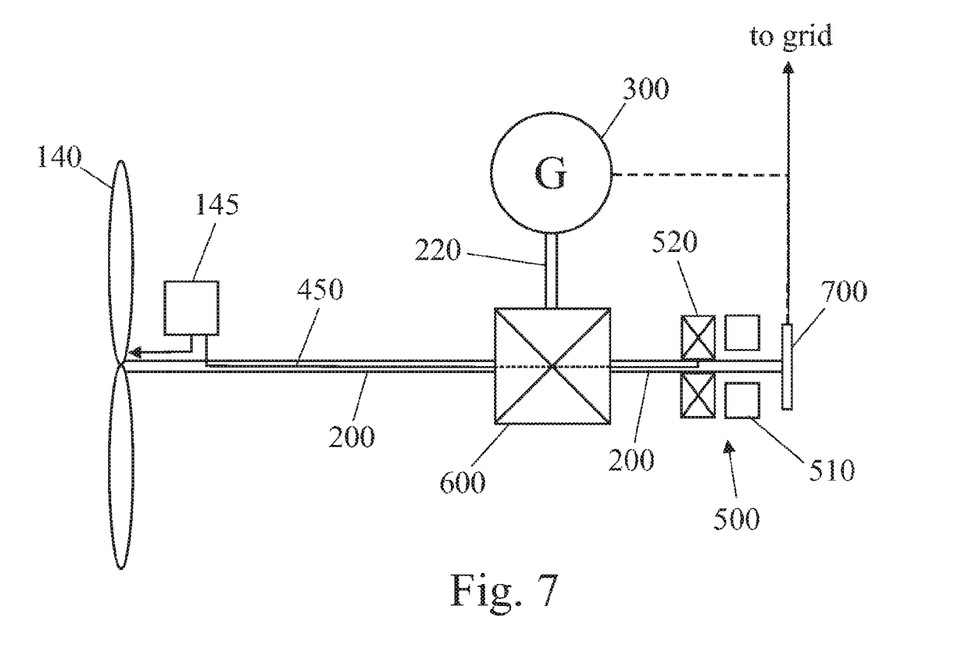
FIG. 7 is a block diagram of an emergency power supply according to another embodiment of the present invention.

FIG. 7 is a block diagram of an emergency power supply according to another embodiment of the present invention. The basic configuration is similar to the embodiment shown in FIG. 6 but the auxiliary generator 500 is formed as a ring generator 500. Ring generator 500 is mounted between the gear box 600 and the slip ring transformer 700. Furthermore, the explanations made above with respect to FIG. 2 apply to the embodiment shown in FIG. 7, accordingly, especially with respect to specific implementations of generator type and pitch motor type.

Figure 8:
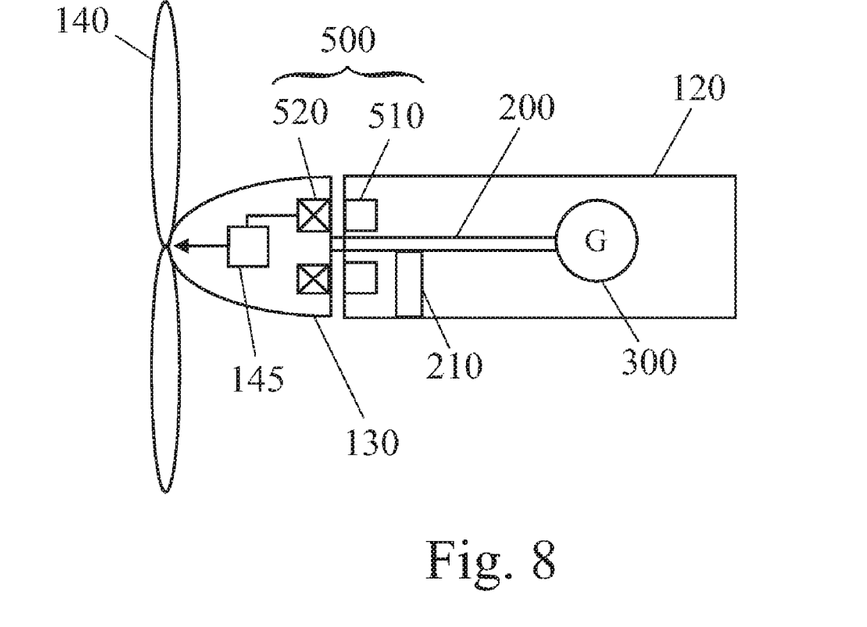
FIG. 8 is a block diagram of an emergency power supply according to still another embodiment of the present invention.

FIG. 8 is a block diagram of a wind turbine according to still another embodiment of the present invention. Therein, rotor blades 140 are mounted to a hub 130. The pitch of rotor blades 140 can be adjusted by a pitch drive 145. Rotor hub 130 is connected to a drive shaft 200 supported on a bearing 210. Drive shaft 200 drives a main generator 300 of the wind turbine so that electric power for a utility grid is generated. A backup generator 500 is provided to supply electric power to pitch drive 145 in a case of emergency, e.g. when main generator 300 cannot provide sufficient electric power to operate the pitch drive 145. Backup generator 500 is formed as a permanently excited multi-pole ring generator, wherein permanent magnets 510 of backup generator 500 are disposed on the end side of nacelle 120 facing the hub 130. The generator windings 520 are provided at the hub 130 and face the permanent magnets 510 disposed at nacelle 120. The permanent magnets 510 induce a voltage in windings 520 when rotor hub 130 rotates with respect to nacelle 120. Backup generator 500 is designed to produce sufficient electric power at low rotational speed, e.g. 12 to 50 rpm, so that pitch drive 145 can be operated. In this context, it should be understood that the explanations made above with respect to FIG. 2 apply to the embodiment shown in FIG. 8, accordingly, especially with respect to specific implementations of generator type and pitch motor type.

Figure 9:
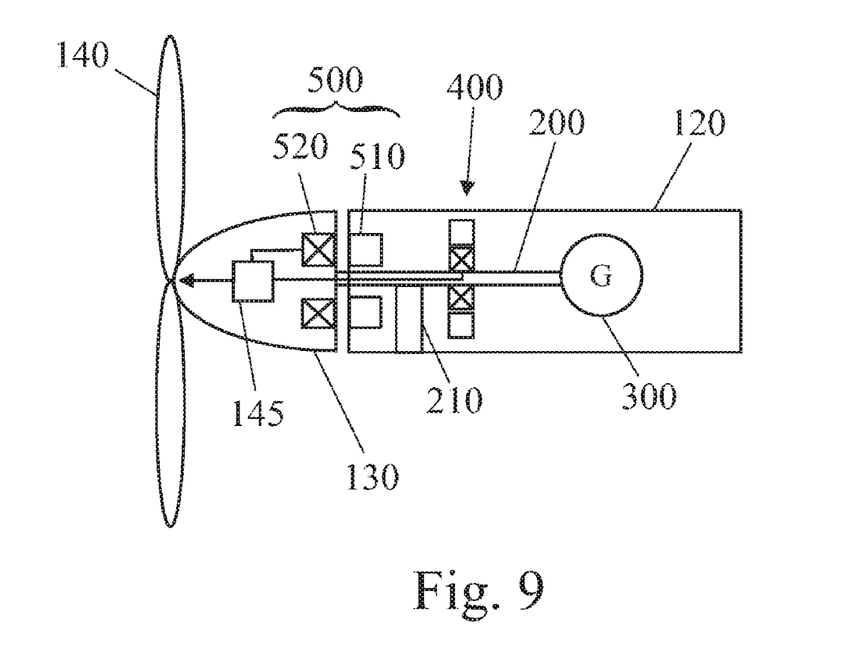
FIG. 9 is a block diagram of an emergency power supply according to a further embodiment of the present invention.

FIG. 9 is a block diagram of a wind turbine according to a further embodiment of the present invention. The basic configuration is similar to the embodiment shown in FIG. 8 but the pitch drive backup system includes a further backup generator 400. The further backup generator 400 is mounted to the low-speed shaft 200 between the generator 300 and the main bearing 210. It should be understood that this specific embodiment reflects a more general safety concept which includes the provision of at least two backup generators. Due to this redundancy, the reliability of the pitch drive power backup system is enhanced and the rotor blades 140 can be turned out of the wind even if one of the backup generators is damaged. In this context, it should be also understood that reliability of the backup system may be further enhanced in that the several backup generators are of a different generator design, respectively. Additionally, the backup generators may be placed at different locations. For example, a first backup generator may be a ring generator mounted between the hub and the nacelle and a second backup generator may be mounted to the low-speed shaft between a gear box and a slip ring transformer. In this respect, the different implementations of generators and pitch motors as described with respect to FIG. 2 may be employed.

Figure 10:
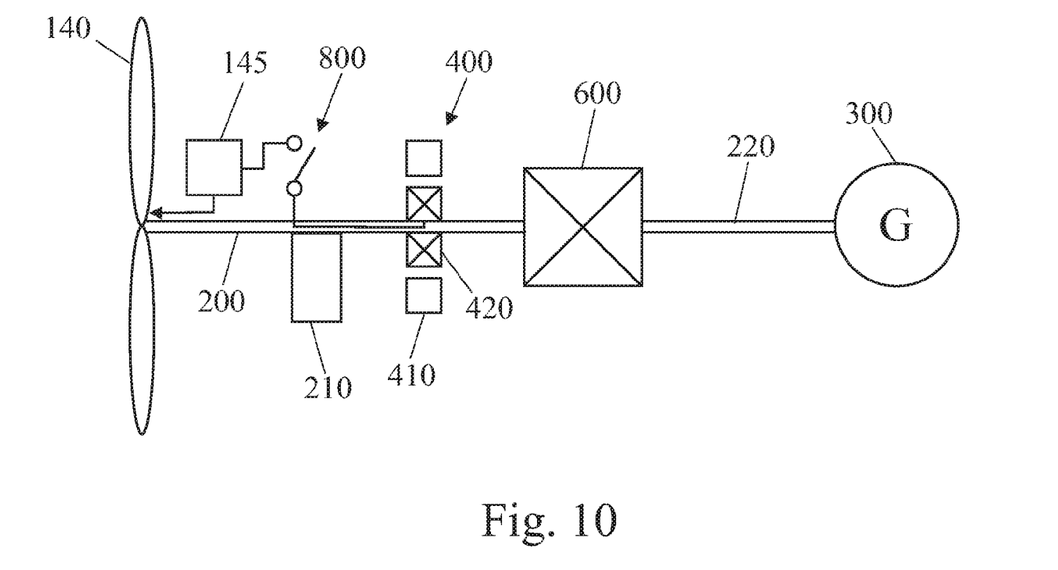
FIG. 10 is a block diagram of an emergency power supply according to an even further embodiment of the present invention.

FIG. 10 is a block diagram of an emergency power supply according to an even further embodiment of the present invention. The basic configuration is similar to the embodiment shown in FIG. 4 but the emergency power supply further includes a switching device 800, e.g. a connector. During normal operation, connector 800 is in an open state so that auxiliary generator 400 is running idle. Thus, only a very small amount of rotational energy is extracted from low-speed shaft 200 by auxiliary generator 400. During normal operation, the electric power for pitch drive 145 is supplied from main generator 300. However, in case of emergency connector 800 closes and pitch drive 145 is connected as a load to auxiliary generator 400. Due to the rotation of shaft 200, auxiliary generator 400 produces electric power which is supplied to pitch drive 145. As has been described above, connector 800 may be connected to a converter (not shown) for converting the electric power from generator 400 into electric power adapted for pitch drive 145.

Figure 11:
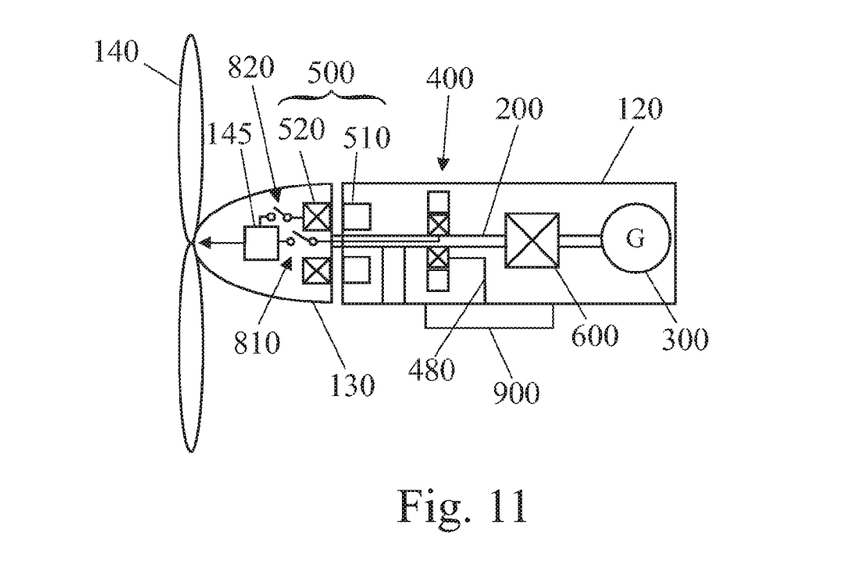
FIG. 11 is a block diagram of an emergency power supply according to still a further embodiment of the present invention.

FIG. 11 is a block diagram of a wind turbine according to still a further embodiment of the present invention. The basic configuration is similar to the embodiment shown in FIG. 9 but the emergency power supply further includes a first switching device 810 and a second switching device 820, e.g. connectors. During normal operation, first and second connectors 810, 820 are in an open state so that backup generators 400, 500 are running idle. Thus, only a very small amount of rotational energy is extracted from the system by backup generators 400, 500. During normal operation, the electric power for pitch drive 145 is supplied from main generator 300. However, in case of emergency one or both of the first and second connectors 810, 820 close and pitch drive 145 is connected as a load to one or both of the backup generators 400, 500. The backup generators 400, 500 convert rotational energy of the system into electric power which is supplied to pitch drive 145. As a further optional feature, second backup generator 400, which is mounted between a gear box 600 and a main bearing, is connected to a nacelle drive 900. Nacelle drive 900 can rotate nacelle 120 with respect to the turbine tower 110. Thus, nacelle 120 can be turned out of the wind.

It should be understood that the embodiments described above with reference to FIGS. 2 to 11 include many features which are non-exclusive with respect to each other and can be combined or included in any of the other embodiments. For example, the functioning of the present invention is independent of a gear box. Although described as an emergency fallback system, it should be understood that the auxiliary generators can be also used to supply energy to the pitch drive during normal operation.

Figure 12:
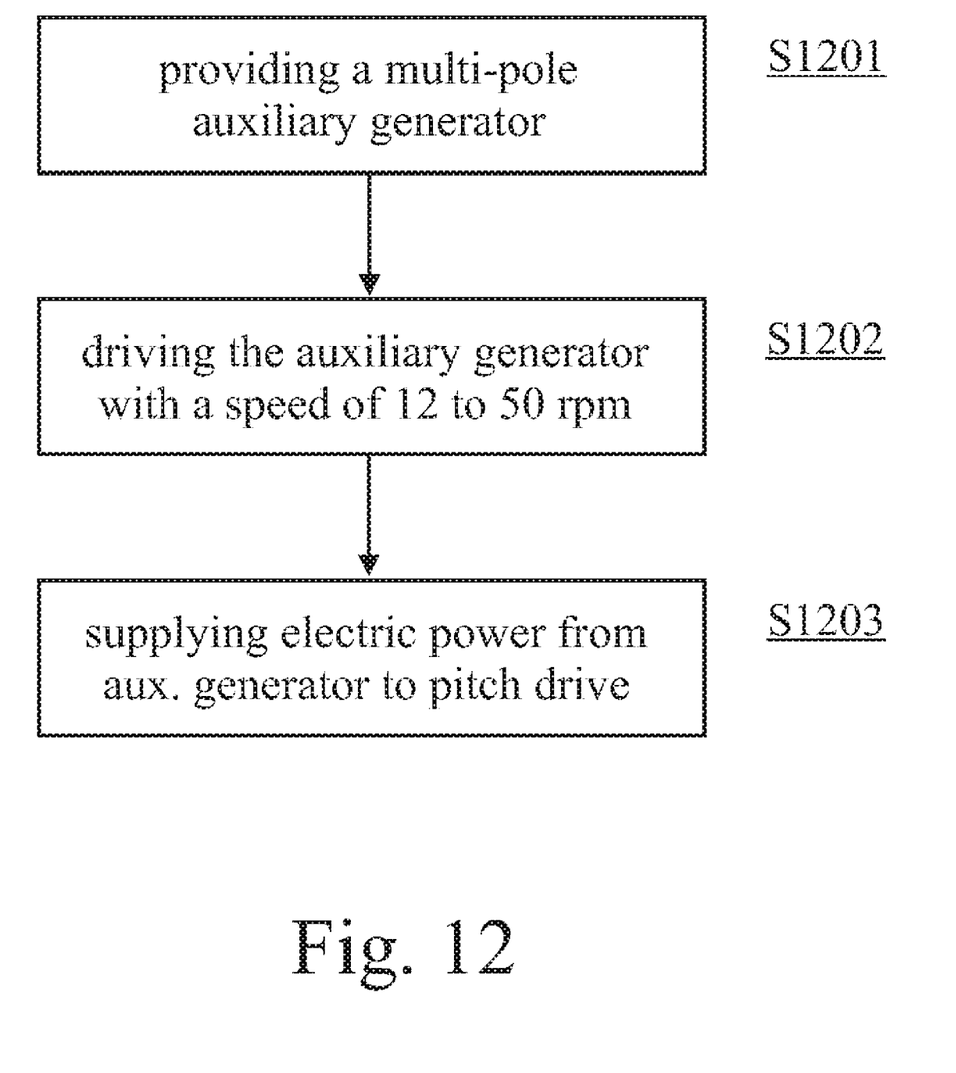
FIG. 12 is a flowchart of a method for supplying electric power in a case of emergency according to an embodiment of the present invention.

FIG. 12 is a flowchart of a method for supplying electric power in a case of emergency according to an embodiment of the present invention. In a first step, a permanently excited multi-pole generator is provided as a pitch drive power backup system (Step S1201). For example, such a backup generator can be provided by retrofitting existing turbines so that the presently installed battery backup can be removed. Next, the backup generator is driven with a low speed in the range of 12 to 50 rpm (Step S1202). Since the backup generator is adapted to provide sufficient electric power even at low speed numbers, the thus produced electric power is supplied to a pitch drive to adjust the pitch of the rotor blades (Step S1203).

Figure 13:
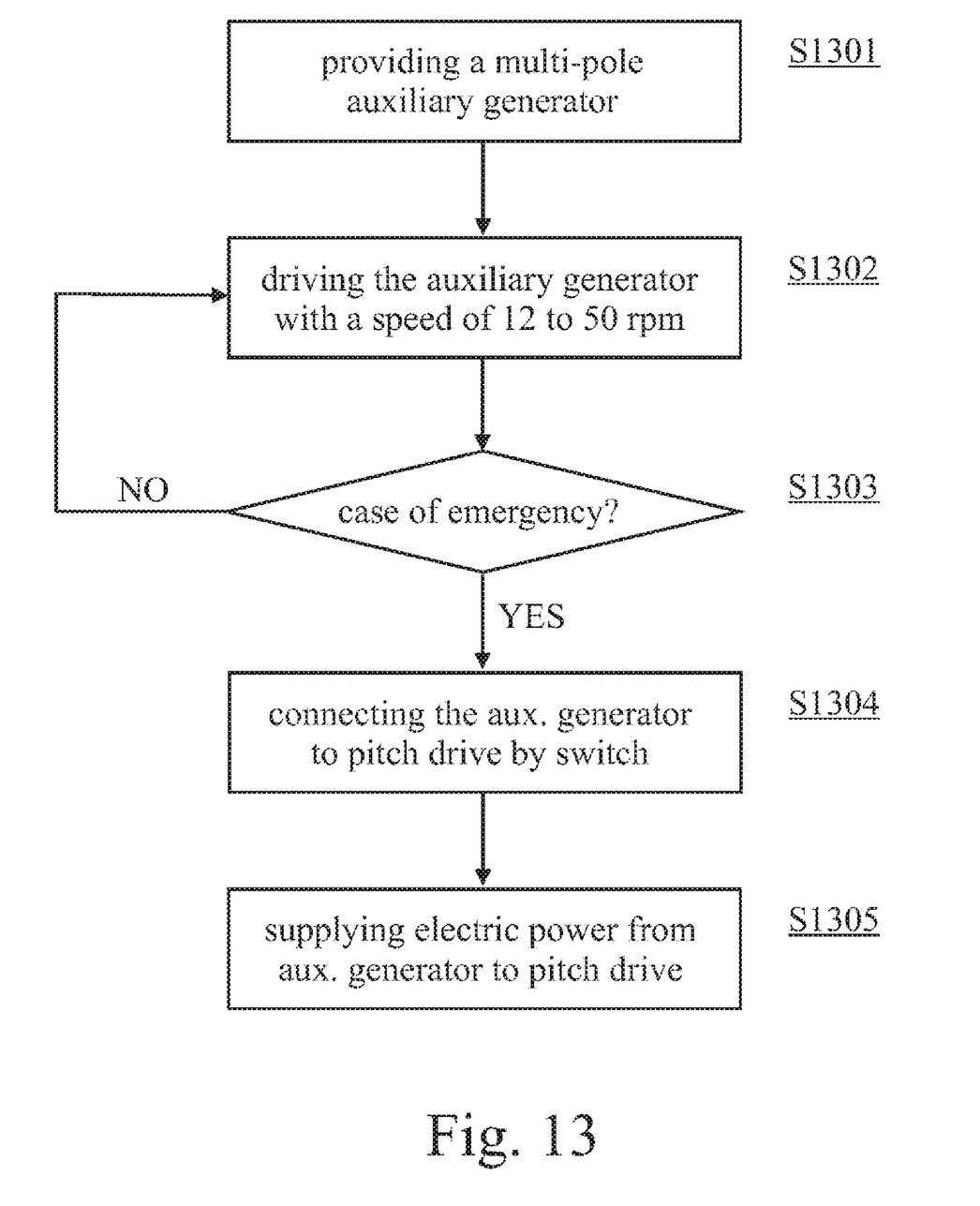
FIG. 13 is a flowchart of a method for supplying electric power in a case of emergency according to a further embodiment of the present invention.

FIG. 13 is a flowchart of a method for supplying electric power in a case of emergency according to a further embodiment of the present invention. In particular, the first steps of providing a backup generator (S1301) and driving the backup generator with a low speed number (S1302) are identical to steps S1201 and S1202. However, if a case of emergency is detected in step S1303, e.g. by a wind turbine controller, a connector is closed an electric connection between the backup generator and the pitch drive is established (Step S1304). Finally, electric power is supplied from the backup generator to the pitch drive (Step S1305) and the rotor blades are turned out of the wind, thus aerodynamically braking the wind turbine.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. An emergency pitch drive power supply system for a wind turbine comprising an auxiliary generator directly driven by a shaft coupled to a wind rotor of the wind turbine;
   wherein the auxiliary generator is a permanently excited multi-pole generator comprising permanent magnets magnetically coupled to windings coupled to the shaft and adapted to generate power for a pitch drive of the wind turbine while the wind rotor is rotating; and
   wherein the auxiliary generator is connected to at least one pitch drive motor of the wind turbine.

2. The emergency pitch drive power supply system according to claim 1, wherein the auxiliary generator is designed for 12 to 50 rpm.

3. The emergency pitch drive power supply system according to claim 1, wherein the auxiliary generator has 12 to 60 poles.

4. The emergency pitch drive power supply system according to claim 1, wherein the auxiliary generator comprises a ring generator.

5. The emergency pitch drive power supply system according to claim 4, wherein the rotor of the ring generator is mounted to a hub of the wind turbine and the stator of the ring generator is mounted to a nacelle of the wind turbine.

6. The emergency pitch drive power supply system according to claim 1, wherein the auxiliary generator is mounted to a low speed rotor shaft of the wind turbine.

7. The emergency pitch drive power supply system according to claim 1, wherein the auxiliary generator comprises a brushless three-phase synchronous generator.

8. The emergency pitch drive power supply system according to claim 7, wherein the at least one pitch drive motor comprises a brushless three-phase asynchronous motor.

9. The emergency pitch drive power supply system according to claim 1, wherein the auxiliary generator comprises a DC generator and the at least one pitch drive motor comprises a DC motor.

10. The emergency pitch drive power supply system according to claim 1, comprising at least one further permanently excited multi-pole auxiliary generator adapted to generate power for a pitch drive of a wind turbine when driven with wind rotor speed, and being connected to the at least one pitch drive motor of a wind turbine.

11. The emergency pitch drive power supply system according to claim 1, further comprising a switching device adapted to supply the electric power produced by the auxiliary generator to the at least one pitch drive motor in a case of emergency.

12. The emergency pitch drive power supply system according to claim 1, wherein the auxiliary generator is further adapted to supply electric power to a nacelle drive of the wind turbine, and
   wherein the auxiliary generator is connected to the nacelle drive of the wind turbine.

13. A wind turbine comprising:
   a wind rotor having at least one rotor blade wherein the pitch of the rotor blade is adjustable by a pitch drive, the wind rotor being connected to a low-speed rotor shaft;
   a main generator drivable via the rotor shaft; and
   a permanently excited multi-pole auxiliary generator connected to the pitch drive and the rotor shaft, the auxiliary generator directly driven by the rotor shaft.

14. The wind turbine according to claim 13, wherein the auxiliary generator comprises a ring generator and the rotor windings of the ring generator are disposed at the wind rotor and the stator magnets of the ring generator are disposed at a nacelle of the wind turbine.

15. The wind turbine according to claim 13, further comprising a gear box wherein the auxiliary generator is mounted to the low-speed rotor shaft between the gear box and a main bearing of the shaft.

16. The wind turbine according to claim 13, further comprising a gear box wherein the auxiliary generator is mounted to the low-speed rotor shaft between the gear box and a slip ring transformer mounted on the shaft.

17. The wind turbine according to claim 13, further comprising at least one further permanently excited multi-pole auxiliary generator.

18. The wind turbine according to claim 17, wherein the at least two auxiliary generators are at least one of different design and mounted at different locations on the drive train of the wind turbine.

19. A method for supplying electric power to at least one pitch drive of a wind turbine in a case of emergency, comprising the steps of:

providing a directly driven permanently excited multi-pole auxiliary generator in a wind turbine;

driving the auxiliary generator with a low speed in the range from 12 to 50 rpm to produce electric power; and     in case of emergency, supplying the electric power to the at least one pitch drive to turn the at least one rotor blade out of the wind.

20. The method according to claim 19, wherein a DC current is generated by the auxiliary generator.

\* \* \* \* \*